(12) United States Patent  
Sato (10) Patent No.: US 7,995,426 B2
(45) Date of Patent: Aug. 9, 2011

(54) OPTICAL DISK APPARATUS AND METHOD (75) Inventor: Michinori Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 861 days.

(21) Appl. No.: 11/570,153

(22) PCT Filed: May 19, 2005

(86) PCT No.: PCT/JP2005/009151
§ 371 (c)(1),
(2), (4) Date: Dec. 7, 2006

(87) PCT Pub. No.: WO2005/122150
PCT Pub. Date: Dec. 22, 2005

(65) Prior Publication Data
US 2008/0002547 A1 Jan. 3, 2008

(30) Foreign Application Priority Data
Jun. 9, 2004 (JP) .................. 2004-170771

(51) Int. Cl.
*G11B 7/004* (2006.01)
(52) U.S. Cl. ............... 369/30.11; 369/53.22; 369/44.29; 714/718
(58) Field of Classification Search ............ 369/30.11, 369/53.22, 53.29, 44.29; 714/718
See application file for complete search history.

(56) References Cited

U.S. PATENT DOCUMENTS 6,192,009 B1 * 2/2001 Kim ........................ 369/44.25
6,708,299 B1 * 3/2004 Xie ............................ 714/718
2002/0097641 A1 7/2002 Kuze et al.
2002/0097990 A1 * 7/2002 Kando et al. .................. 386/126
2003/0227839 A1 12/2003 Yamamoto
2004/0047252 A1 * 3/2004 Miyatake et al. .......... 369/47.12

(Continued)

FOREIGN PATENT DOCUMENTS
JP 10-228713 8/1998
(Continued)

OTHER PUBLICATIONS

European Search report for corresponding application No. EP 05741612 issued on Jan. 30, 2009.

(Continued)

*Primary Examiner* — Hoa T Nguyen
*Assistant Examiner* — Andrew J Sasinowski
(74) *Attorney, Agent, or Firm* — Renner, Otto, Boisselle & Sklar, LLP (57) ABSTRACT

It is highly precisely determined as to whether or not a laser-irradiated position on an optical disk is positioned within an identification area (BCA) in which identification information is recorded, and the position of the identification information area is efficiently determined.
An optical disk apparatus includes an optical pickup for detecting reflected light from an optical disk and generating a light amount signal, and a detecting section for outputting a detection signal which is in accordance with a change in the signal level of the light amount signal, the detection signal indicating that the change has continued for a first predetermined time or longer. Furthermore, the optical disk apparatus includes a pulse signal output section which, each time the detection signal is output, outputs a pulse signal which continues for a second predetermined time, and an area determination section which determines whether an irradiated position of light is within the identification area or not based on a continuing duration of the pulse signal.

9 Claims, 9 Drawing Sheets

U.S. PATENT DOCUMENTS

| | | | |
|---|---|---|---|
| 2004/0062164 A1* | 4/2004 | Miyamoto et al. | 369/53.26 |
| 2004/0062179 A1* | 4/2004 | Tsurumi et al. | 369/108 |
| 2004/0105370 A1* | 6/2004 | Hsu et al. | 369/53.22 |
| 2004/0125731 A1* | 7/2004 | Park | 369/59.25 |

FOREIGN PATENT DOCUMENTS

| | | |
|---|---|---|
| JP | 11-328857 | 11/1999 |
| JP | 2002-216366 | 8/2002 |
| JP | 2002-279624 | 9/2002 |
| JP | 2003-331436 | 11/2003 |

OTHER PUBLICATIONS

International Search Report for corresponding Application No. PCT/JP2005/009151 mailed Aug. 9, 2005.

* cited by examiner

(a) BCA

T = 1 Channel Bit Length (b) NBCA

T = 1 Channel Bit Length

FIG.10

OPTICAL DISK APPARATUS AND METHOD

TECHNICAL FIELD

The present invention relates to a technique of reading identification information from an optical disk on which bar-code like (stripe-form) identification information is described in some of its area.

BACKGROUND ART

In recent years, optical disks under various standards have been being developed and becoming prevalent. For example, CD-ROMs/DVD-ROMs, which are read-only optical disks; CD-Rs/DVD-Rs, which are write-once type optical disks to which data can be written only once; DVD-RAMs and CD-RWs/DVD-RWs, which are rewritable optical disks; and the like are widely known.

Among the optical disks, there are some optical disks which have an area called BCA (Burst Cutting Area). For example, a DVD-RAM or DVD-ROM has a BCA at the innermost peripheral position of the optical disk. A BCA has a bar-code like pattern, which allows identification information for identifying the optical disk to be recorded. This pattern is recorded already at the shipment of the product. An optical disk apparatus reads such identification information before beginning a recording or reading of other information, thus being able to utilize it for the generation of encryption keys, or determine whether playback is permitted or not.

Hereinafter, a procedure of reading identification information which is recorded in a BCA using a conventional optical disk playback apparatus will be described.

Figure 1:
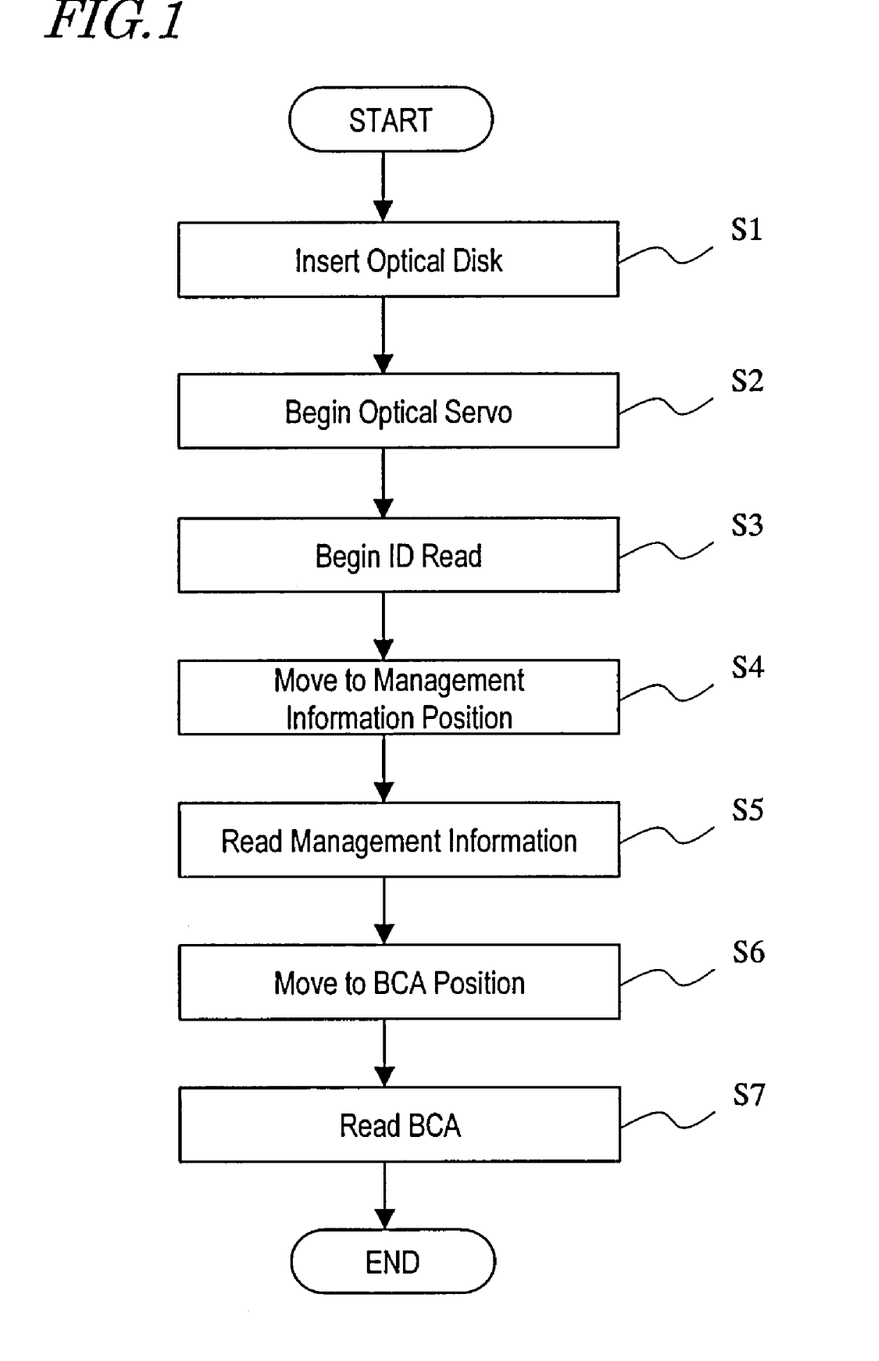
[FIG. 1] A flowchart showing an operation procedure of a conventional optical disk playback apparatus.

FIG. 1 shows an operation procedure of a conventional optical disk playback apparatus. For example, Patent Document 1 discloses an optical disk playback apparatus which operates in accordance with the procedure shown in FIG. 1. First, at step S1, an optical disk is inserted in the optical disk playback apparatus. At step S2, the apparatus begins optical servo for the optical disk, and at step S3 begins to read address information (ID) from the optical disk. Then, at step S4, it moves to a management information position (area) by utilizing the ID, and at step S5 reads management information. Since it is possible to read management information, the position of the management information is determined. Since it is stipulated in the standard that the management information should be disposed at a specific radial position toward the outer periphery from the BCA, the apparatus is able to reach the BCA position by moving a specific distance toward the inner periphery from the position of the management information at step S6. Then, at step S7, the identification information in the BCA can be read.

The reason why the BCA is not directly accessed but is accessed by way of the management information area is that no address can be stably determined within the BCA because the identification information in the BCA is added by processing an area of the optical disk. Note that, from any position toward the outer periphery from the BCA, a movement can be made to the management information position without going by way of the BCA.

On the other hand, the identification information which is recorded in the BCA can also be read by other techniques. For example, in an optical disk playback apparatus which is described in Patent Document 2, a switch is provided at a designed position of an optical pickup which is taken when radiating light toward the BCA. The position of the BCA can be detected by utilizing this switch, and thus the identification information can be read.

[Patent Document 1] Japanese Laid-Open Patent Publication No. 10-228713
[Patent Document 2] Japanese Laid-Open Patent Publication No. 2003-331436

DISCLOSURE OF INVENTION

Problems to be Solved by the Invention

However, the above two procedures also have various problems.

For example, if the laser-irradiated position happens to be already in the BCA when optical servo is begun by the apparatus described in Patent Document 1, the identification information cannot be read. The reason is that the apparatus must first determine the position where the management information exits. Furthermore, the stripe pattern in the BCA prevents the apparatus from determining the address (ID) or adjusting optical servo, and therefore management information cannot be read thereafter.

In order to avoid the above situation, optical servo must be begun at a position away from the BCA. However, such an operation would result in the initial laser-irradiated position being away also from the management information position. As a result, movement to the management information position would take time. It would take even more time to arrive at the BCA and read the identification information.

On the other hand, if a switch is provided as in the apparatus described in Patent Document 2, there is an increased cost associated with the switch. Moreover, since the switch must be precisely disposed with a precision of about 1 mm or less so as to correspond to the position of the BCA, there is a consequent increase in the production cost. Moreover, if this position is shifted upon application of a shock or the like to the apparatus, it will no longer be possible to determine the position of the BCA.

An objective of the present invention is to highly precisely determine whether or not a laser-irradiated position is positioned within an identification area (BCA) in which identification information is recorded, and efficiently determine the position of the identification information area.

Means for Solving the Problems

An optical disk apparatus according to the present invention is capable of reading information which is recorded on an optical disk. The optical disk includes: a data area in which main information to be saved is recorded or to be recorded; and an identification area which has optical characteristics different from those of the data area and in which identification information for identifying the optical disk is recorded. The optical disk apparatus includes: an optical pickup for radiating light onto the optical disk and detecting reflected light from the optical disk to generate a light amount signal; a detection section for outputting a detection signal which is in accordance with a change in the signal level of the light amount signal; a pulse signal output section for outputting, each time the detection signal is output, a pulse signal which continues for a second predetermined time; and an area determination section for determining whether an irradiated position of the light is within the identification area or not based on a continuing duration of the pulse signal.

The detection section may output the detection signal which indicates that the change in the signal level of the light amount signal has continued for a first predetermined time or longer.

The detection section may calculate an average value of the signal level of the light amount signal, and output the detection signal when the level of the light amount signal remains lower than the average value continuously for the first predetermined time or longer.

The detection section may output the detection signal when the level of the light amount signal remains lower than a predetermined fixed value continuously for the first predetermined time or longer.

The detection section may retain as the fixed value a design value which is lower than a minimum level of the light amount signal obtained during a read of the main information and which is higher than a minimum level of the light amount signal obtained during a read of the identification information.

The area determination section may compare the value of the continuing duration against a predetermined threshold value and acquire a result as to whether or not the value is equal to or less than the threshold value.

The area determination section may determine that the irradiated position of the light is within the identification area when the value of the continuing duration is equal to or greater than the threshold value, and determine that the irradiated position of the light is not at the identification area when the continuing duration is less than the predetermined threshold value.

The area determination section may compare the value of the continuing duration and the predetermined threshold value before one rotation cycle of the optical disk elapses.

The identification area of the optical disk may be one of a burst cutting area and a narrow burst cutting area, in which a plurality of stripes are added, the identification information being described in terms of intervals at which the plurality of stripes are recorded, and the pulse signal output section may set the second predetermined time to be equal to or greater than a time which is necessary for reading two adjoining stripes that are recorded at a maximum interval.

The detection section may measure changing periods during which the signal level of the light amount signal changes, and output by every third predetermined time a detection signal which specifies a longest period among the changing periods.

Each time the detection signal is output, the pulse signal output section may determine whether or not the longest period has continued for a fourth predetermined time or longer, and if it has, output a pulse signal which continues for the third predetermined time.

Effects of the Invention

According to the present invention, by taking advantage of the fact that stripes in an identification area in which identification information is recorded (or specifically, BCA of an optical disk) are periodically provided, it is determined as to whether an irradiated position of light is within an identification area or not. Specifically, since the signal level of a reflected light amount signal periodically changes when light is radiated onto the identification area, a pulse signal which continues for a predetermined time is output every time such a change is detected. Then, based on the continuing duration of the pulse signal, it is determined as to whether the irradiated position of light is within the identification area or not.

According to the present invention, since it is not necessary to determine the position of a management information area and perform a servo operation, it is possible to efficiently move to the position of the identification information area and read the identification information. Moreover, since it is unnecessary to provide a switch for detecting the position of the identification information area as in conventional techniques, there are no concerns as to any increase in cost associated with the mounting of a switch.

BRIEF DESCRIPTION OF DRAWINGS

[FIG. 3] (a) is a diagram showing areas which are provided on an optical disk 101; (b) is a diagram showing the waveform of an RF signal when laser light is radiated onto a BCA 202; and (c) is a diagram showing the waveform of an RF signal when laser light is radiated onto a management information area 203.

[FIG. 4] (a) is a diagram showing the waveform of an RF signal. (b) is a diagram showing the waveform of a stripe detection signal. (c1) is a diagram showing the waveform of a stripe detection signal which takes a high level once in one rotation cycle. (c2) is a diagram showing the waveform of a stripe detection signal which takes a high level a plurality of times in one rotation cycle. (d1) is a diagram showing the waveform of a BCA detection signal which takes a high level only during a period B. (d2) shows the waveform of a BCA detection signal whose high level period continuously continues longer than a period B. (e1) is a diagram showing a relationship between a detected period X of the BCA detection signal and a reference period C. (e2) is diagram showing a relationship between a detected period X of the BCA detection signal and the reference period C.

[FIG. 6] (a) is a diagram showing the waveform of an RF signal whose level drop is shorter than period A; (b) is a diagram showing the waveform of a stripe detection signal; (c) is a diagram showing the overall waveform of a stripe detection signal; and (d) is a diagram showing the waveform of a BCA detection signal.

[FIG. 8] (a) is a diagram showing the waveform of an RF signal which is output from an optical pickup 104; (b) is a diagram showing a result of comparison between the longest low period and a reference period E; (c) is a diagram showing a partial waveform of a BCA detection signal; and (d) is a diagram showing the waveform of a BCA detection signal over a longer period of time.

[FIG. 9] (a) is a diagram showing the waveform of a stripe detection signal which is output corresponding to a BCA; and (b) is a diagram showing the waveform of a stripe detection signal which is output corresponding to an NBCA.

[FIG. 10] (a) is a diagram showing a relationship between a level S, which is lower than an average level L, and an RF signal; and (b) is a diagram showing the waveform of a stripe detection signal which is output from a stripe detection section 105 while the level of the RF signal is equal to less than S.

DESCRIPTION OF REFERENCE NUMERALS 10, 20 optical disk apparatus
101 optical disk 102 motor
103 revolutions control section
104 optical pickup
105 stripe detection section
106 retriggerable one-shot multivibrator
107 area determination section
108 optical pickup transportation mechanism
109, 128 microcomputer
110, 120 optical disk controller
125 low period detection section
126 stripe determination section
127 area determination section
202 BCA
203 management information area

BEST MODE FOR CARRYING OUT THE INVENTION

Hereinafter, with reference to the accompanying drawings, embodiments of the information processing apparatus according to the present invention will be described.

Embodiment 1

In the present embodiment, as an information processing apparatus, an optical disk apparatus which is capable of recording information onto a DVD-RAM, and playback recorded information therefrom will be described.

Figure 2:
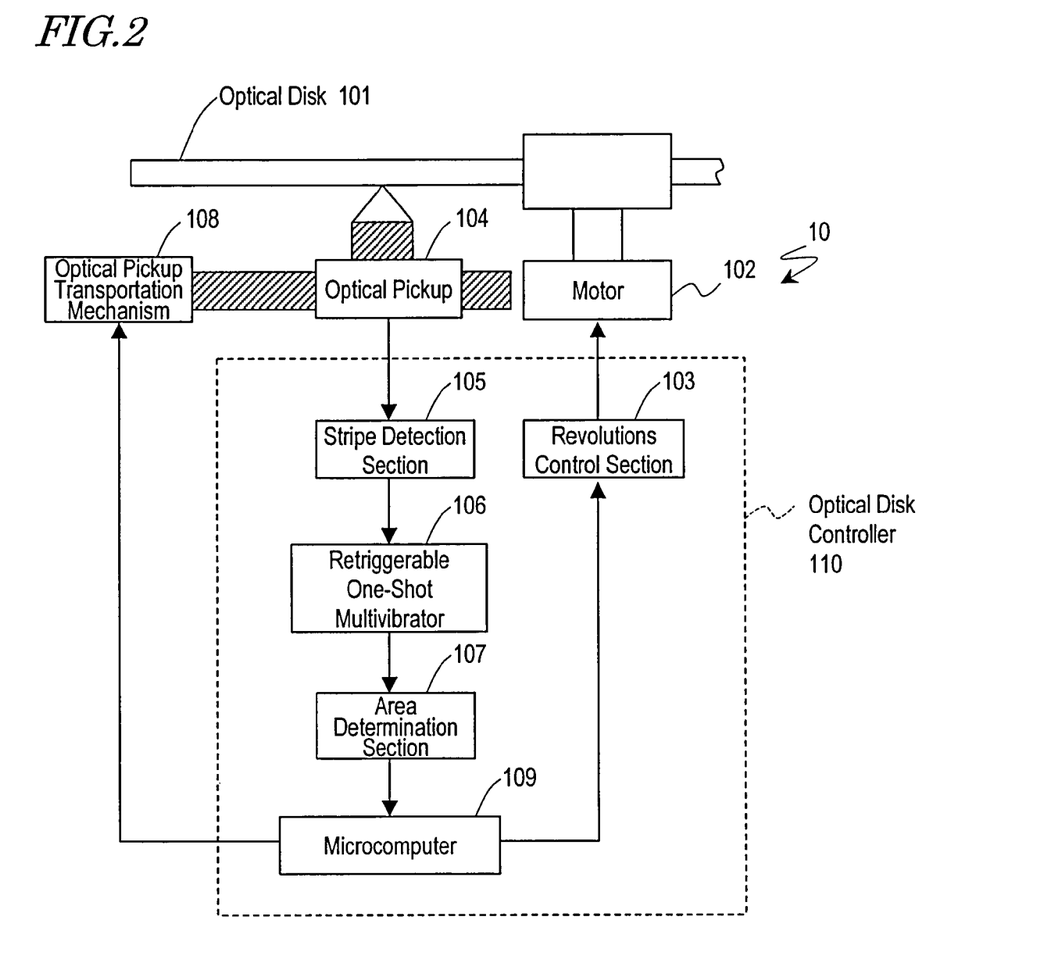
[FIG. 2] A diagram showing the arrangement of functional blocks of an optical disk apparatus 10 according to Embodiment 2.

FIG. 2 show the arrangement of functional blocks of an optical disk apparatus 10 according to the present embodiment. The optical disk apparatus 10 includes a motor 102, an optical pickup 104, an optical pickup transportation mechanism 108, and an optical disk controller 110. Although FIG. 2 also shows an optical disk 101, note that the optical disk 101 is not a component element of the optical disk apparatus 10 because it is removable from the optical disk apparatus 10.

The optical disk apparatus 10 is capable of recording information onto an optical disk (DVD-RAM) 101, and playing back recorded information therefrom. "Information" which is recorded onto the optical disk 101 means, in the case where a user records a broadcast program onto the optical disk 101, for example, information such as video and audio of the program to be enjoyed. In the case where the user saves a computer program, a document or the like onto the optical disk 101, "information" means the data such as the program, document, or the like. Hereinafter, such "information" to be recorded onto the optical disk 101 will be referred to as "main information".

Figure 3:
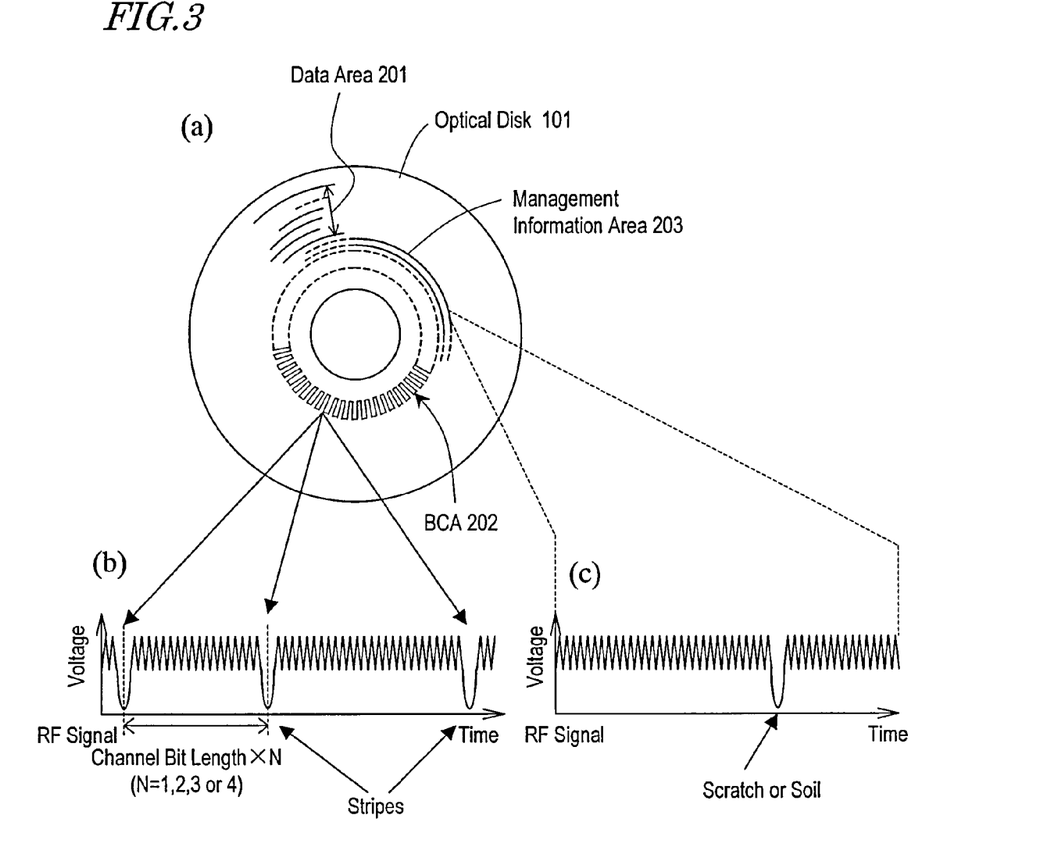

On the optical disk 101, various areas are defined, including an area in which main information is recorded. FIG. 3(a) shows areas which are provided on the optical disk 101. The optical disk 101 includes: a data area 201 in which main information is recorded; a BCA (Burst Cutting Area) 202 in which identification information concerning the optical disk 101 is recorded; and a management information area 203 in which management information or the like concerning playback or the like of the main information is recorded.

The BCA 202 is located at the innermost periphery of the optical disk 101. In the optical disk 101 having a diameter of 12 cm, the BCA 202 is an area ranging between a radius of 22.3 mm (+0.0/−0.4 mm) to a radius of 23.5 mm (±0.05 mm).

The BCA 202 includes a bar-code like pattern. This pattern is formed by, for example, radiating intense laser light or the like after forming a track having address information, thus causing substantial partial changes in the optical characteristics (reflectance). Depending on what sort of pattern is provided, various information can be recorded. For example, each individual optical disk may be uniquely identified by changing the pattern from optical disk to optical disk, or a type may be identified by changing the pattern depending on the type of optical disk (disks for rental use or disks to be sold away, etc). In the following descriptions, portions whose optical characteristics have been changed so as to compose a bar-code like pattern will be referred to as stripes.

Near the outer periphery of the BCA 202, the management information area 203 is located. Further at the outer peripheral side of the management information area 203, the data area 201 is located. Main information is to be recorded in the data area 201. Management information for controlling the playback of main information is to be recorded in the management information area 203.

Referring back to FIG. 2, the structure of the optical disk apparatus 10 will be described. The motor 102 causes the optical disk 101 to be rotated with a predetermined angular speed or linear speed. The optical pickup 104 radiates laser light onto the optical disk 101, and detects reflected light from the optical disk 101 to generate a light amount signal (RF signal). The optical pickup transportation mechanism 108 (hereinafter referred to as "transportation mechanism 108") moves the optical pickup 104 along a radial direction of the optical disk 101.

The optical disk controller 110, which may be a semiconductor chip circuit that is realized as a large-scale integrated circuit (LSI), for example, controls the recording operation of main information, and the playback operation of main information as well as management information and identification information (described later), by the optical disk apparatus 10. The optical disk controller 110 is composed of various functional blocks. Specifically, the optical disk controller 110 includes a revolutions control section 103, a stripe detection section 105, a multivibrator 106, an area determination section 107, and a microcomputer 109.

The functions of the respective component elements of the optical disk controller 110 are as follows. The revolutions control section 103 controls the revolutions of the motor 102. The stripe detection section 105 outputs a detection signal which is in accordance with an RF signal that is output from the optical pickup 104. More specifically, if the level of the RF signal changes to or below an average level L of the hitherto RF signal and that state continues for a predetermined period or longer, the stripe detection section 105 outputs a pulse signal (detection signal).

The retriggerable one-shot multivibrator 106 (hereinafter referred to as "multivibrator 106") has a function of outputting a pulse signal in response to reception of a signal. When receiving a detection signal which is output from the stripe detection section 105, it outputs a pulse signal (BCA detection signal) whose high level continues for a duration B, in response to this signal as a trigger. If a detection signal is again output from the stripe detection section 105 and is input as a trigger to the multivibrator 106 while the multivibrator 106 is outputting a pulse signal, the multivibrator 106 outputs a pulse whose high level continues for the duration B as starting from when this trigger is input.

Against a reference period C, the area determination section 107 compares a continuous high level period (detected period) X of the BCA detection signal in one rotation cycle of the optical disk 101. The area determination section 107 determines that the current irradiated position is within the BCA 202 if the detected period X is longer than the reference period C, and determines that the current irradiated position is not within the BCA 202 if the detected period X is shorter than the reference period C.

The microcomputer 109 designates a number of revolutions to the revolutions control section 103, and causes the optical disk 101 to rotate. In accordance with the result of area determination by the area determination section 107, the microcomputer 109 controls the transportation mechanism 108. Based on this control, the transportation mechanism 108 moves the optical pickup 104. Based on the laser light which is radiated from the optical pickup 104 and reflected from the optical disk 101, the optical disk apparatus 10 reads and plays back information.

In the present embodiment, if the information to be read is the identification information of the BCA 202, the microcomputer 109 adjusts the position of the optical pickup 104 so that laser light is radiated at an outer peripheral position near the BCA 202, e.g., a position corresponding to the management information area 203. Then, the microcomputer 109 causes the area determination section 107 to determine whether this position is within the BCA 202 or not, based on the reflected light. If it is not within the BCA 202, the optical pickup 104 is moved a certain distance toward the inner periphery, and it is further determined whether that position is within the BCA 202 or not. This process is repeated until the result of determination indicates "within the BCA", when laser is finally radiated into the BCA 202.

FIG. 3(b) shows the waveform of an RF signal when laser light is radiated onto the BCA 202. FIG. 3(c) shows the waveform of an RF signal when laser light is radiated onto the management information area 203. Either RF signal is generated by the optical pickup 104 based on the reflected light from the BCA 202 and the management information area 203.

As can be seen from the RF signal waveform of FIG. 3(b), the voltage level of the RF signal is low at the stripes which are provided in the BCA 202. This is because the stripes have a relatively low reflectance. Note that the interval at which level drops of the RF signal occur corresponds to the interval of the stripes. The interval of the stripes is N times the channel bit length (N: 1, 2, 3 or 4).

On the other hand, as can be seen from the RF signal waveform of FIG. 3(c), the RF signal may also drop due to scratches or soil, etc., even when the laser light is radiated onto areas other than the BCA 202, for example. Even in this case, the optical disk apparatus 10 must accurately determine that the drop of the RF signal is not being caused by the stripes. Then, upon determining that the current irradiated position of laser light is within the BCA 202, identification information must be read based on the bar-code like pattern formed by the stripes.

Hereinafter, it will be described how the optical disk apparatus 10 determines whether the current laser light-irradiated position is within the BCA 202 or not. First, the microcomputer 109 issues an instruction to the revolutions control section 103 to cause the optical disk 101 to rotate by setting it at a number of revolutions for reading the identification information in the BCA 202. Then, an instruction is also issued to the transportation mechanism 108 to cause the optical pickup 104 to move its position so that the laser irradiated position will be near the BCA but toward the outer periphery, e.g., within the management information area 203.

Thereafter, the optical pickup 104 radiates laser light onto the optical disk 101, and upon receiving reflected light therefrom, generates an RF signal having a level which is in accordance with the received amount of light. FIG. 4(a) shows the waveform of an RF signal. The RF signal has a level-drop portion. This drop corresponds to a single stripe in the BCA 202. However, even outside the BCA 202, if a scratch exists on the optical disk 101, for example, a drop will appear corresponding to the scratch.

The stripe detection section 105 generates a stripe detection signal in accordance with changes in the signal level of the RF signal. FIG. 4(b) shows the waveform of a stripe detection signal. In the present embodiment, once a period A or more has elapsed since the RF signal has become equal to or less than the level L, the stripe detection section 105 outputs a stripe detection signal which maintains a high level. The level L is an average value of the signal level of the RF signal which is obtained by radiating laser light onto the management information area 203 or the data area 201, and is calculated based on the level of the RF signal which has hitherto been acquired by the stripe detection section 105.

As shown in FIG. 4(a), the RF signal becomes equal to or less than the level L at time t0, and it still remains equal to or less than the level L at time t1, after the lapse of the period A. The level of the RF signal becomes equal to or greater than L at time t2. Therefore, from time t1 till t2, the stripe detection section 105 outputs a stripe detection signal which is at a high level.

It must be noted here that, depending on whether the irradiated position of laser light is within the BCA 202 or not, the frequency with which the RF signal drops changes. In the present embodiment, the optical disk apparatus 10 determines whether the irradiated position of laser light is within the BCA 202 or not based on the frequency with which the RF signal drops. The principles thereof are as follows.

If the irradiated position of laser light is outside the BCA 202, and a scratch exists on the optical disk 101, for example, an RF signal with a waveform shown in FIG. 4(a) will be obtained. In this case, since the laser light passes over the scratch in each rotation of the optical disk 101, the RF signal drops once or so in one rotation cycle.

Figure 4:
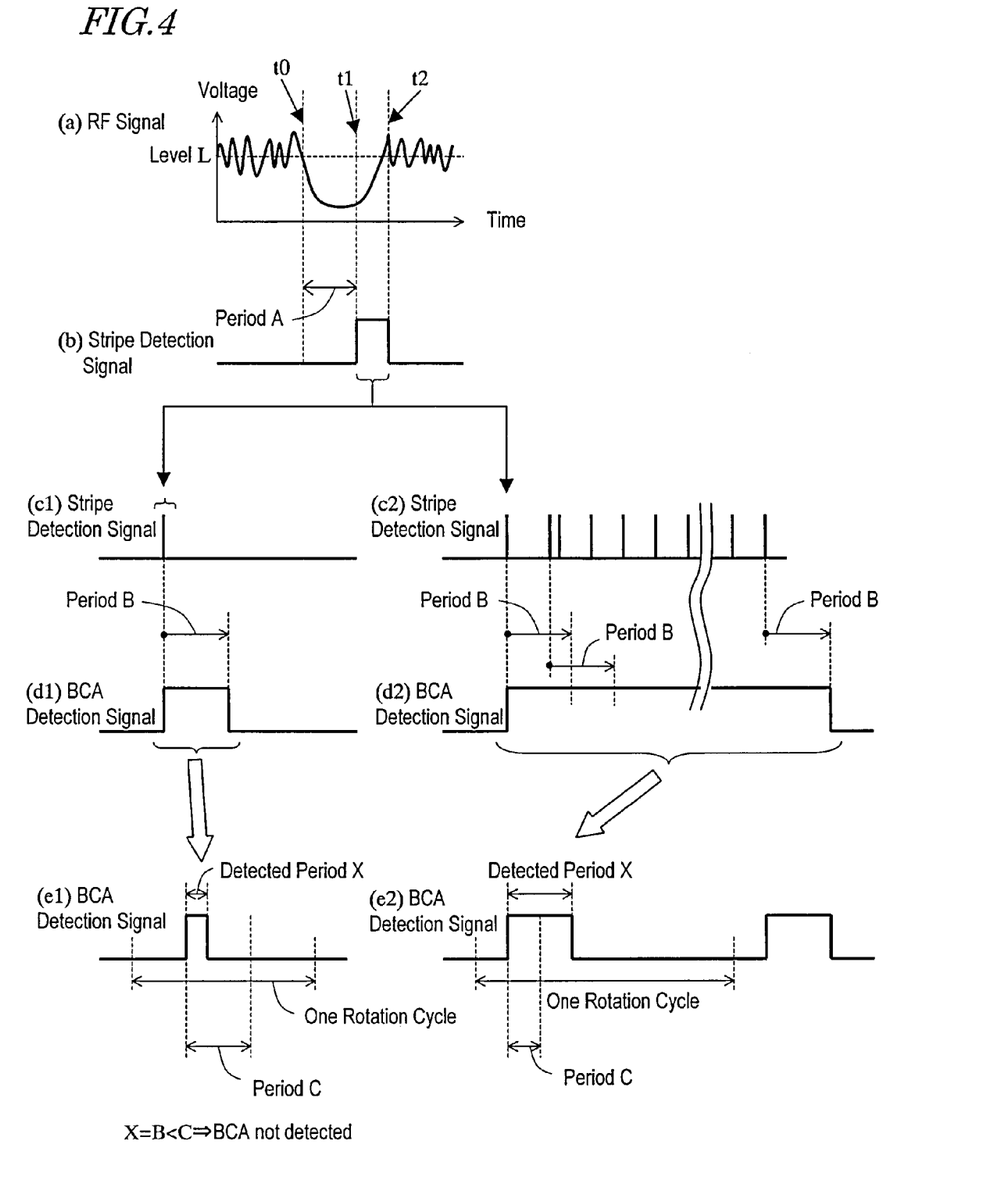

As a result, the stripe detection section 105 generates a stripe detection signal which takes the high level once in one rotation cycle. FIG. 4(c1) shows the waveform of a stripe detection signal which takes the high level once in one rotation cycle. If the stripe detection section 105 outputs a stripe detection signal (pulse signal) which is at the high level, the multivibrator 106 receives this output, and outputs a BCA detection signal which takes a high level only during a period B. FIG. 4(d1) shows the waveform of a BCA detection signal which takes a high level only during the period B. Note that the multivibrator 106 may calculate the period B from a leading edge or a trailing edge of the stripe detection signal which is at the high level.

Upon receiving the BCA detection signal, the area determination section 107 makes a comparison as to whether the period (detected period X) for which the high level of the BCA detection signal continues in one rotation cycle is longer than the reference period C or not. FIG. 4(e1) shows a relationship between a detected period X of the BCA detection signal and the reference period C. The detected period X=B, and they are shorter than the reference period C. When this comparison result is obtained, the area determination section 107 determines that the current irradiated position of laser light is not at the BCA 202.

Thereafter, the microcomputer 109 instructs the transportation mechanism 108 to move the position of the optical pickup 104 by a certain distance to a position which is closer to the inner periphery of the optical disk 101. This distance is equal to less than the minimum width of the BCA 202 as defined under the specifications, for example. Then, again based on an output of the RF signal, it is determined whether the irradiated position of laser light is within the BCA 202 or not.

Next, if the irradiated position of laser light is within the BCA 202, the RF signal drops a plurality of times in one rotation cycle, corresponding to the stripes on the optical disk 101. As a result, the stripe detection section 105 generates a stripe detection signal which takes the high level a plurality of times in one rotation cycle. FIG. 4(c2) shows the waveform of a stripe detection signal which takes the high level a plurality of times in one rotation cycle. Each time the stripe detection section 105 outputs a stripe detection signal which is at the high level and the multivibrator 106 receives this output, a BCA detection signal is output which takes the high level for the period B from that point in time. In other words, triggered by the occurrence of a pulse of the stripe detection signal which is at the high level, the multivibrator 106 keeps generating a BCA detection signal which takes the high level for another extended time B.

FIG. 4(d2) shows the waveform of a BCA detection signal whose high level period continuously continues longer than the period B. The stripe detection section 105 outputs a stripe detection signal with an interval which is shorter than the period B. This is based on the fact that the stripes are disposed with an interval which is N times the channel bit length (N: 1, 2, 3 or 4). The multivibrator 106 outputs a BCA detection signal whose high-level continuing period continues longer than the period B.

Upon receiving the BCA detection signal shown in FIG. 4(d2), the area determination section 107 makes a comparison as to whether the period (detected period X) for which the high level of the BCA detection signal continues after the lapse of one rotation cycle is longer than the reference period C or not. In the example shown in FIG. 4(e2), the detected period X is longer than the reference period C. When this comparison result is obtained, the area determination section 107 determines that the current irradiated position of laser light is within the BCA 202. Then, identification information is acquired based on the stripes which are provided in the BCA 202. The identification information can be determined based on the waveform of the stripe detection signal shown in FIG. 4(c2).

Note that the area determination section 107 does not need to await the lapse of one rotation cycle before performing the above comparison. For example, even before the lapse of one rotation cycle, it may be determined that the laser light-irradiated position is within the BCA when the high level detected period of the BCA detection signal has become equal to or greater than C. Since it is not necessary to await the lapse of one rotation cycle, the time until the result of determination is obtained can be reduced.

Figure 5:
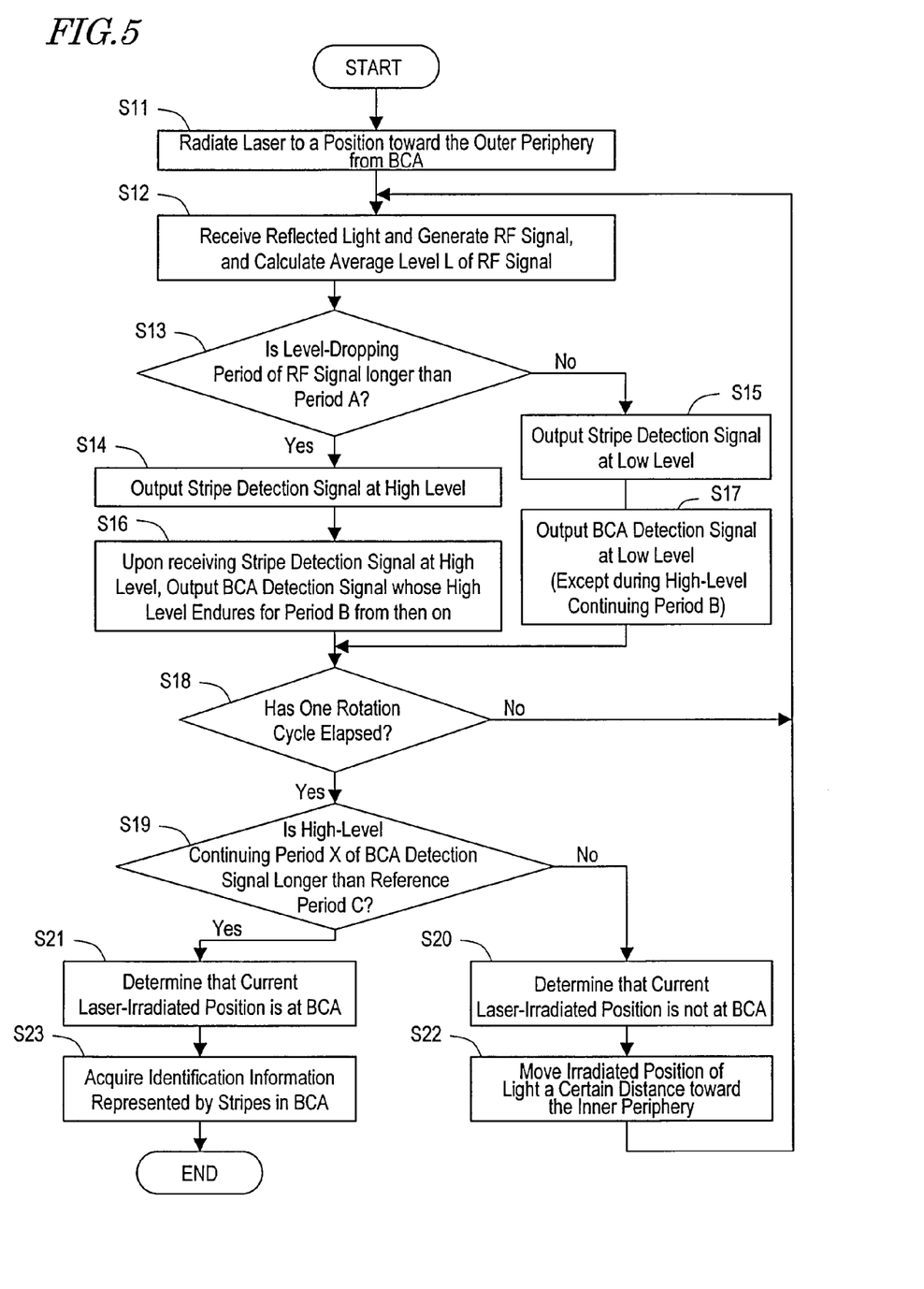
[FIG. 5] A flowchart showing the procedure of a reading process for identification information which is performed in the optical disk apparatus 10.

FIG. 5 shows the procedure of a reading process for identification information which is performed in the optical disk apparatus 10. First, at step S11, the optical pickup 104 radiates laser to a position which is toward the outer periphery from the BCA 202, and at step S12, the optical pickup 104 receives the reflected light and generates an RF signal. Then, the stripe detection section 105 calculates an average level L of the RF signal. At the next step S13, the stripe detection section 105 determines whether the level-dropping period of the RF signal is longer than the period A or not. If longer, control proceeds to step S14; if shorter, control proceeds to step S15.

At step S14, the stripe detection section 105 outputs a stripe detection signal which is at the high level, and control proceeds to step S16. At step S16, the multivibrator 106 receives the stripe detection signal which is at the high level, and outputs a BCA detection signal whose high level continues for the period B from then on. Thereafter, the process proceeds to step S18.

On the other hand, at step S15, the stripe detection section 105 outputs a stripe detection signal which is at a low level, and control proceeds to step S17. At step S17, the multivibrator 106 outputs a BCA detection signal which is at a low level. However, if this point in time falls during the aforementioned high-level continuing period B, where a BCA detection signal which is at the high level is already being output, the multivibrator 106 continues to output the BCA detection signal which is at the high level. Thereafter, the process proceeds to step S18.

At step S18, the microcomputer 109 determines whether one rotation cycle has elapsed or not. If it has not elapsed, the process returns to step S12 and the hitherto process is repeated until one rotation cycle elapses. If it has elapsed, the process proceeds to step S19.

At step S19, the area determination section 107 determines whether the high-level continuing time X of the BCA detection signal is longer than the reference period C or not. If shorter, control proceeds to step S20; if longer, control proceeds to step S21.

At step S20, the area determination section 107 determines that the current laser-irradiated position is not at the BCA. At step S22, the microcomputer 109 instructs the transportation mechanism 108 to move the optical pickup 104, thus moving the irradiated position of light by a certain distance toward the inner periphery. Thereafter, the process returns to step S12, and the aforementioned process is continued until the current laser-irradiated position is determined to be at the BCA 202.

On the other hand, at step S21, the area determination section 107 determines that the current laser-irradiated position is within the BCA 202. Then control proceeds to step S23, and from the determined BCA 202, the microcomputer 109 acquires identification information which is represented by the stripes.

Through the aforementioned process, the determination process of the optical disk apparatus 10 is completed. The aforementioned process is effective also in the case where some of the stripes fail to be detected due to a recording error, for example. The reason thereof will be described with reference to FIGS. 6(a) to (d) below.

Figure 6:
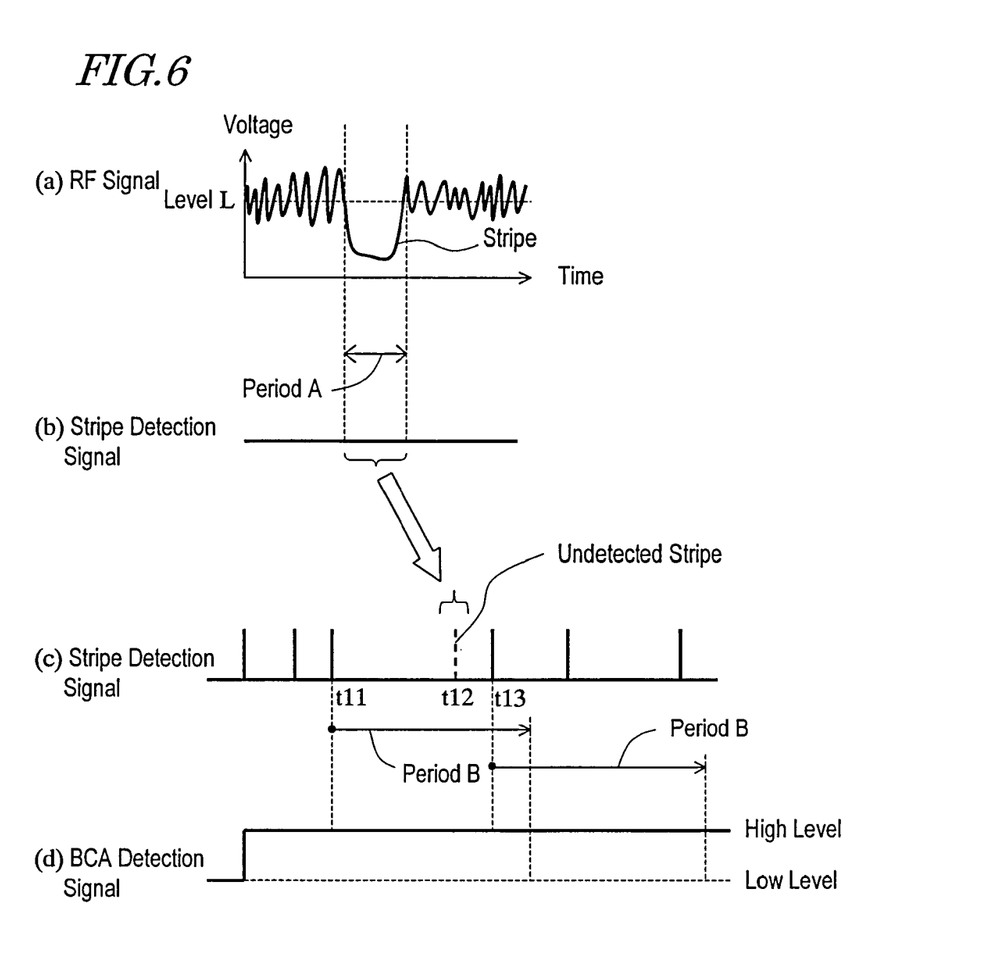

FIG. 6(a) shows the waveform of an RF signal whose level drop is shorter than the period A. This waveform may occur in the case where the stripes do not possess a sufficient width along the circumferential direction (in case of a recording error).

Even if an RF signal shown in FIG. 6(a) is obtained, since its level drop is shorter than the period A, the stripe detection section 105 does not output a stripe detection signal which is at the high level. FIG. 6(b) shows the waveform of the stripe detection signal. It can be seen that the stripe detection signal is at the low level.

FIG. 6(c) shows the overall waveform of the stripe detection signal. It is assumed that, corresponding to stripes, high-level stripe detection signals are obtained at time t11 and time t13. It is assumed that a high-level stripe detection signal that corresponds to an undetected stripe would otherwise have been obtained at time t12. Time t12 is a point in time which falls after time t11 and before time t13.

FIG. 6(d) shows the waveform of a BCA detection signal. Based on the high-level stripe detection signal which was output before time t11, the multivibrator 106 has already begun outputting a BCA detection signal which is at the high level. The multivibrator 106 extends outputting of the high-level BCA detection signal at time t11, so that the high level is retained also at time t12. The span from time t11 to time t12 is always shorter than the high-level retaining period B of the multivibrator 106. Furthermore, the span from time t11 to time t13 is shorter than the high-level retaining period B of the multivibrator 106. This is because the stripes are periodically recorded at a predetermined interval. In other words, as shown in FIG. 3(b), the stripe interval is defined as "channel bit length×N" (N=1, 2, 3 or 4). Therefore, even if one stripe fails to be detected, the BCA detection signal which is output from the multivibrator 106 is still retaining its high level. As a result, through a procedure similar to that which was described above, the area determination section 107 is able to determine that the current laser-irradiated position is within the BCA 202 or not.

Thus, by utilizing the periodicity of the stripes, even if some of the stripes fail to be detected, it is still possible to properly determine whether the irradiated position of laser light is within the BCA 202 or not. Moreover, any drop of the RF signal that is caused by a scratch or the like positioned outside the BCA 202 will not have periodicity. Therefore, even if a stripe detection signal is generated, it is not likely to reach the reference period C, so that any laser light-irradiated position falling outside the BCA 202 will not be wrongly detected to be within the BCA 202.

Note that a commonly-used optical disk apparatus will decode identification information after moving the irradiated position of laser light to within the BCA 202. Since it is common practice to perform an error correction at the time of decoding, there is already provided a function of avoiding misdetection of stripes. However, the performance of the entire reading process can be improved by further utilizing the determination process of the BCA 202 according to the present embodiment.

Embodiment 2

In the present embodiment, it is determined whether the irradiated position of laser light is within the BCA 202 or not, through a method different from that of Embodiment 1. In the present embodiment, no retriggerable one-shot multivibrator is used.

Figure 7:
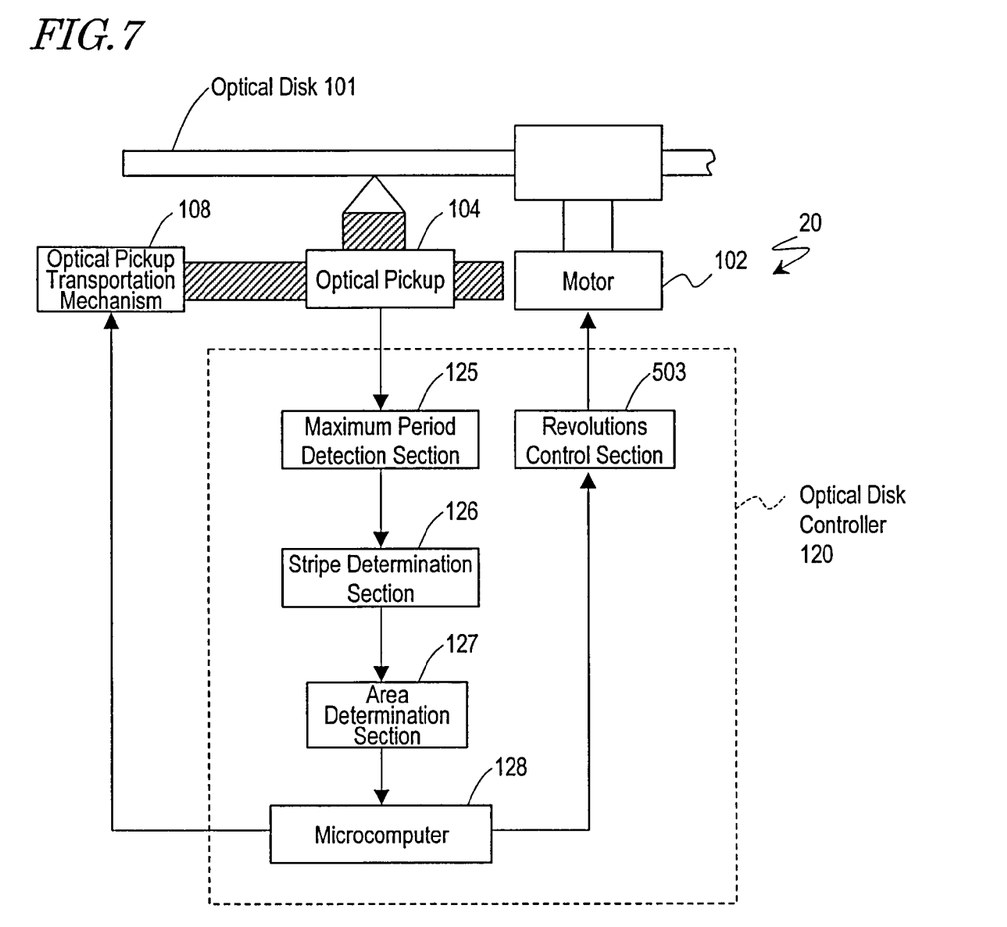
[FIG. 7] A diagram showing the arrangement of functional blocks of an optical disk apparatus 20 according to Embodiment 2.

FIG. 7 shows the arrangement of functional blocks of an optical disk apparatus 20 according to the present embodiment. The optical disk apparatus 20 includes a motor 102, an optical pickup 104, an optical pickup transportation mechanism 108, and an optical disk controller 120. The optical disk controller 120 includes a revolutions control section 103, a low period detection section 125, a stripe determination section 126, an area determination section 127, and a microcomputer 128. Among the various component elements shown in FIG. 7, the component elements which are identical in function and structure to those of the optical disk apparatus 10 according to Embodiment 1 will be denoted by like numerals, and their descriptions will be omitted.

Hereinafter, the component elements included in the optical disk controller 120 will be described. During a predetermined period D, the low period detection section 125 detects low periods of an RF signal. The period D is a period of time which is an M times aliquot of one rotation cycle of the optical disk 101 (where M is a positive integer). Among the M low periods which have been detected by the low period detection section, the stripe determination section 126 compares between the longest low period and a specific period E, and determines that a stripe exists if the longest low period is equal to or greater than the reference period E, and determines that no stripe exists if the longest low period is less than the reference period E. In accordance with the result of determination, it outputs a pulse signal (BCA detection signal). If a stripe exists, the BCA detection signal maintains a high level during that period D; if no stripe exists, the BCA detection signal maintains a low level during that period D.

In the above description, the low period detection section 125 detects low periods, whereas the stripe determination section 126 performs determination of the longest low period, comparison against the reference period E, and outputting of a BCA detection signal. However, for example, the low period detection section 125 may perform determination of the longest low period, in addition to detection of low periods. In this case, the stripe determination section 126 is in charge of comparison between the longest low period and the reference period E, and outputting of a BCA detection signal. Furthermore, the low period detection section 125 may perform determination of the longest low period and comparison between the longest low period and the reference period E, in addition to detection of low periods. Then, if the longest low period is equal to or greater than the reference period E, the low period detection section 125 outputs a detection signal indicating the fact. The stripe determination section 126 will output a BCA detection signal every time receiving this output.

Based on the BCA detection signal, the area determination section 127 determines whether the irradiated position of laser light is within the BCA 202 or not. Specifically, if the high-level continuing period of the BCA detection signal is equal to or greater than the reference period F, the area determination section 127 determines that the irradiated position of laser light is within the BCA 202. On the other hand, if the high-level continuing period of the BCA detection signal is less than the reference period F, it is determined that the irradiated position of laser light is outside the BCA 202.

Figure 8:
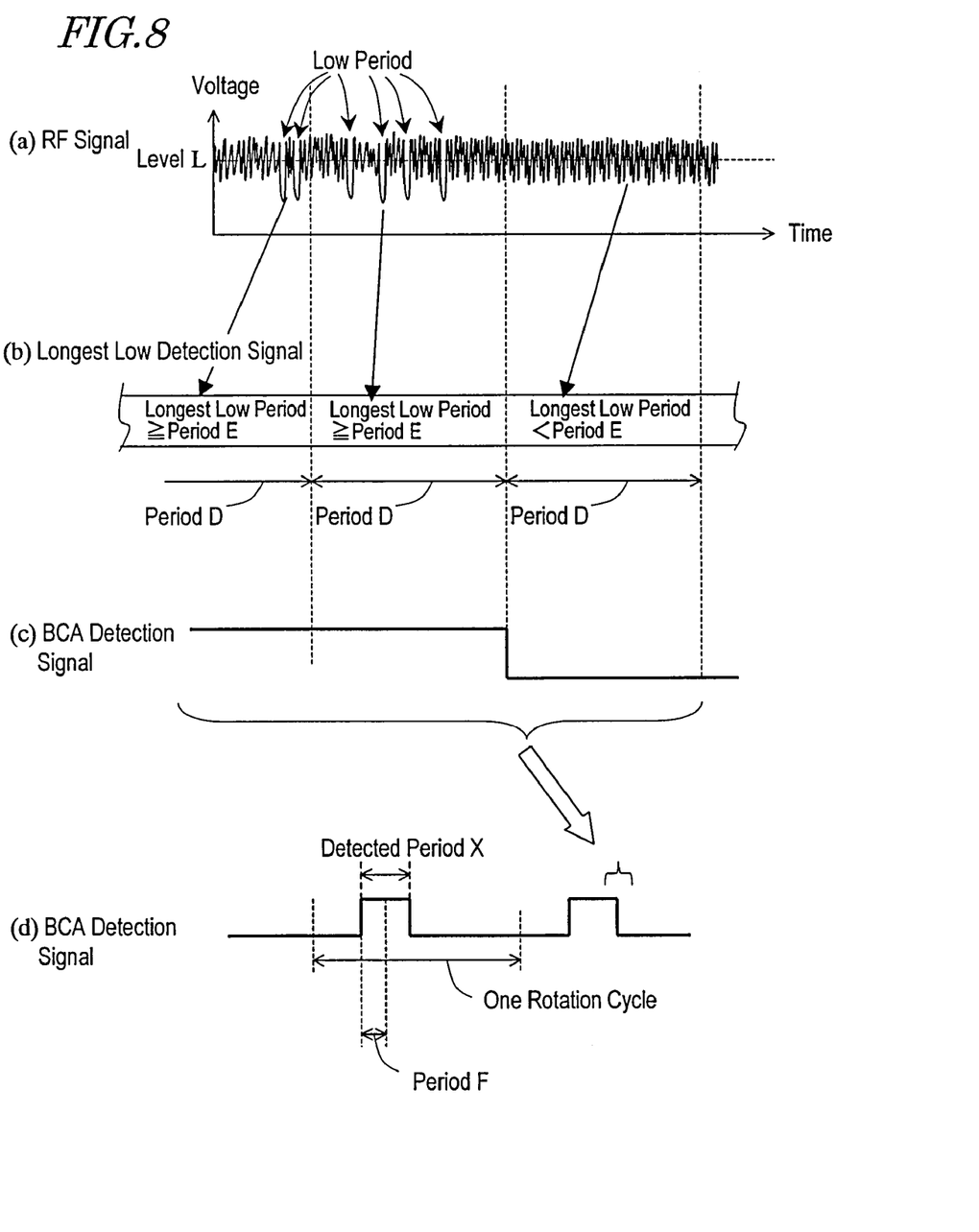

Now, with reference to FIGS. 8(a) to (d), the processing by the optical disk apparatus 20 will be described. FIG. 8(a) shows the waveform of an RF signal which is output from the optical pickup 104. In response to this RF signal, the low period detection section 125 measures the longest period since the RF signal has become equal to or less than a level L. The level L is an average value of the RF signal which is obtained by radiating laser light onto the management information area 203 or the data area 201 of the optical disk 101. For example, the low period detection section 125 only retains the longest period up to that point, and updates the retained value when any longer period has been measured. By repeating this update process by the unit of the period D, the longest low period is determined for each period D. The RF signal has a waveform such that the low period is relatively long in portions corresponding to the stripes. FIG. 8(a) shows low periods in a plurality of places corresponding to the stripes. It is considered that one of these gives the longest low period during each period D. On the other hand, when no stripe exists at the irradiated position of laser light, the longest low period in the waveform of the RF signal appears relatively short.

The stripe determination section 126 compares between the longest low period and the reference period E, and determines which one of these periods is longer. FIG. 8(b) shows a result of comparison between the longest low period and the reference period E. In the case where a waveform corresponding to a stripe as defined under the specifications exists in the RF signal, the reference period E is equal to or less than the low level period where the average level of the RF signal as defined under the specifications is regarded as L; and, in the case where no waveform corresponding to a stripe as defined under the specifications exists in the RF signal, the reference period E is longer than the low level period where the average level of the RF signal as defined under the specifications is regarded as L. In each period D, the stripe determination section 126 outputs a high-level BCA detection signal when the longest low period is equal to or greater than the reference period E, and outputs a low-level BCA detection signal when the longest low period is less than the reference period E. FIG. 8(c) shows a partial waveform of the BCA detection signal. FIG. 8(d) shows a waveform BCA detection signal over a longer period of time.

The area determination section 127 compares between the high-level continuing period of the BCA detection signal and the reference period F. Then, if the high-level continuing period is longer, it is determined that the irradiated position of laser light is within the BCA 202. If the high-level continuing period is shorter, it is determined that the irradiated position of laser light is not within the BCA 202.

Note that the area determination section 127 does not need to await the lapse of one rotation cycle before performing the above comparison. For example, even before the lapse of one rotation cycle, it may be determined that the laser light-irradiated position is within the BCA when the high level detected period of the BCA detection signal has become equal to or greater than F. Since it is not necessary to await the lapse of one rotation cycle, the time until the result of determination is obtained can be reduced.

According to the present embodiment, even if the low period of one stripe fails to be equal to or greater than E due to a recording error, the low period of another stripe within the same period D will be adopted as the longest low period, and so long as this period becomes equal to or greater than E, a BCA detection signal will be output without fail. Therefore, even if some of the stripes fail to be detected, it can be properly determined whether the laser light-irradiated position is within the BCA or not.

Various variants are contemplated in implementing the processes according to Embodiment 1 and/or Embodiment 2 above in an optical disk apparatus. Hereinafter, such variants will be described.

First, it will be described how the BCA detection process of the present invention can be applied even if the type of optical disk changes.

In Embodiments 1 and 2 above, the determination process of the BCA 202 has been described on the assumption that the optical disk 101 is a DVD-RAM. However, DVD-Rs/-RWs, etc., which are already widely known, also have an area which is equivalent to a BCA. However, since the width along the radial direction of such an area is narrower than that of the above-described BCA, the area is called a narrow burst cutting area (NBCA). BCA and NBCA are similar in terms of the fact that stripes are provided with a predetermined interval (period). Therefore, the process which has been described in Embodiments 1 and 2 can be applied in a quite similar manner.

Figure 9:
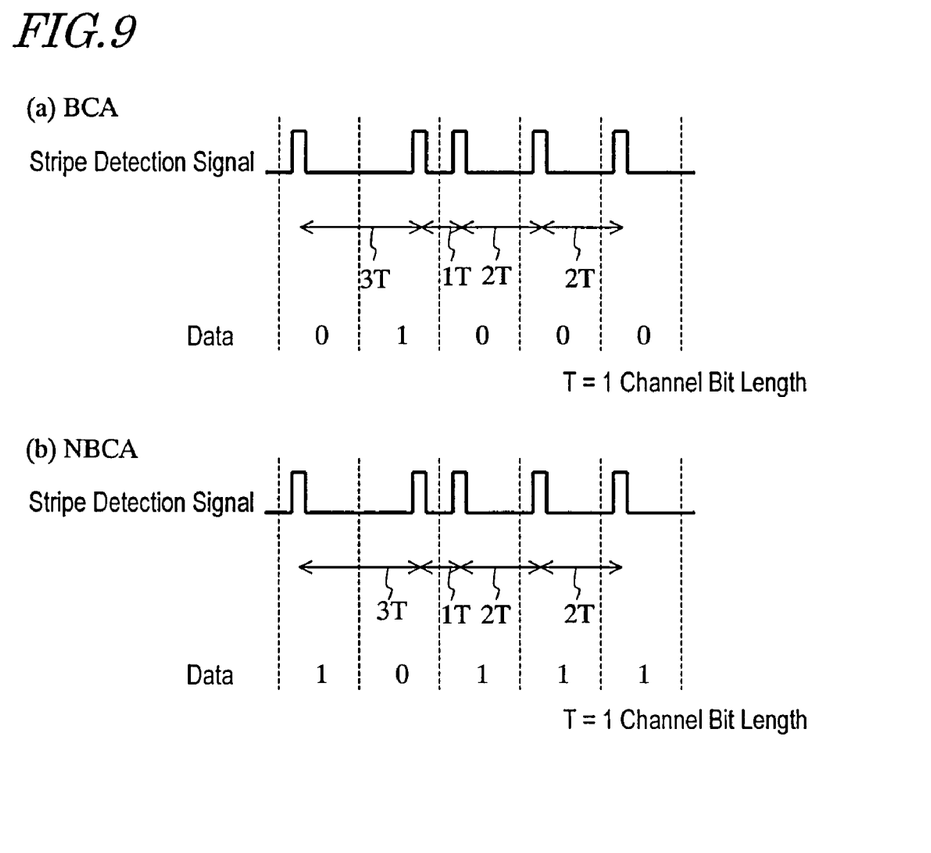

For example, FIG. 9(a) shows the waveform of a stripe detection signal which is output corresponding to a BCA. FIG. 9(b) shows the waveform of a stripe detection signal which is output corresponding to an NBCA. It will be understood that quite the same waveform is obtained also for an NBCA. Note that, since the data value logic is reversed between BCA and NBCA, the bits of the resultant data values are inverted.

Since BCA and NBCA are defined under different specifications, they are provided at different radial positions on the optical disk. Therefore, in Embodiment 1, for example, the "position near the BCA but toward the outer periphery" may be read as the "position near the NBCA but toward the outer periphery", and its position may be determined according to the specifications; thus, the operation of the optical disk apparatus 10 will otherwise be the same. The same will also be true for the optical disk apparatus 20 of Embodiment 2 described above.

Thus, not only BCA and NBCA but also any area may be processed in a stripe-form that has main information or management information recorded therein, whereby such an area can be determined by utilizing the procedures of Embodiments 1 and 2. For example, a DVD-ROM having a BCA would also be applicable. In this case, the optical disk apparatus 20 may be a read-only DVD player. Moreover, the above-described process of the present invention is applicable also to Blu-ray discs or HD-DVDs for which recording and playing back of information is performed by utilizing a blue-violet semiconductor laser light, so long as a BCA is provided.

Next, a variant concerning the reference level for the RF signal will be described.

In Embodiment 1, a stripe detection signal which is at the high level is output in reference to the average level L of the RF signal. In Embodiment 2, the beginning and end of a low period are measured in reference to the average level L of the RF signal. However, other levels may also be used as references.

Figure 10:
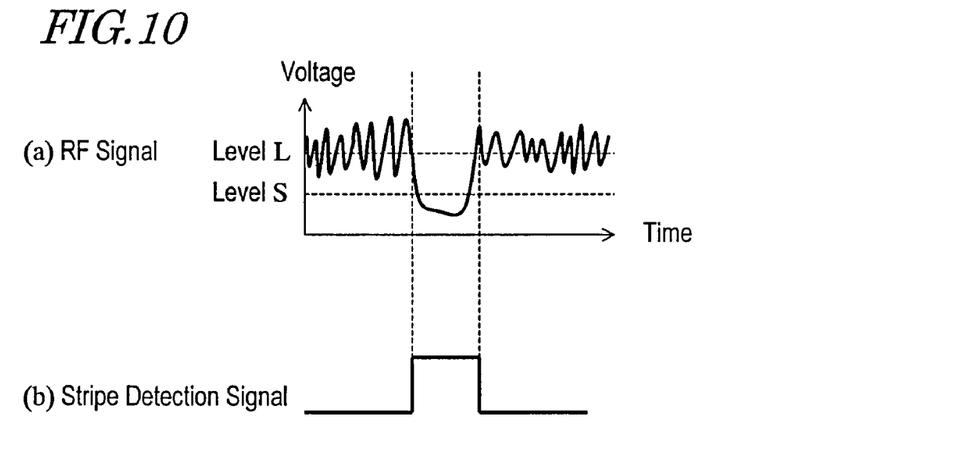

For example, in Embodiment 1, a stripe detection signal can be generated by using a different reference level. FIG. 10(a) shows a relationship between a level S, which is lower than the average level L, and an RF signal. For example, the level S is set so as to be lower than the designed minimum level of an RF signal which appears when main information or management information is read, and yet higher than the designed minimum level of an RF signal corresponding to a stripe.

The stripe detection section 105 shown in FIG. 2 outputs a high-level stripe detection signal while the level of the RF signal is equal to less than S. FIG. 10(b) shows the waveform of a stripe detection signal which is output from the stripe detection section 105 while the level of the RF signal is equal to less than S. One difference is that the average level L of the RF signal is determined in a relative manner based on the RF signal which is acquired upon each read, whereas the aforementioned level S is predetermined as a fixed value. The average level L and the level S may be switched between one another, depending on the situation. Note that optical disk apparatuses traditionally perform a process for detecting a scratch or the like on an optical disk. In doing so, the aforementioned level S may be utilized to detect scratches.

Next, a variant of the operation of the multivibrator 106 of Embodiment 1 will be described. In Embodiment 1, each time a stripe detection signal which is at the high level is received, the multivibrator 106 outputs a BCA detection signal whose high level continues for the period B, being triggered by that signal. Now, it will be described why it is more preferable that the period B has a length of time which corresponds to at least four times as large as the channel bit length of the BCA 202.

As has already been described with reference to FIG. 3(b), the interval of the stripes is defined to be N times as large as the channel bit length (where N=1, 2, 3 or 4). As has been described in connection with FIG. 6(c), even if one stripe may not be detected, the BCA detection signal is not likely to exhibit any influence so long as the two adjoining stripes, i.e., one before and one after that stripe, are properly detected.

However, if the period B is equal to or greater than at least four times the channel bit length of the BCA signal, a failure in stripe detection will not exhibit any influence, thus being able to output a BCA detection signal which is more stably accurate. The reason is that, even if detection of a stripe fails, the BCA detection signal does not take the low level at the point in time when that stripe would have been detected.

The aforementioned variant concerning the period B can also be applied to the operation of the low period detection section 125 in Embodiment 2. Specifically, in Embodiment 2, a period D is defined as an M times aliquot of one rotation cycle of the optical disk 101 (where M is a positive integer), and the low period detection section 125 detects low periods of the RF signal during this period D. Similarly, this period D also preferably has a length of time which corresponds to at least four times or more of the channel bit length of the BCA 202. The reason is that, if the period D is set to be equal to or greater than at least four times the channel bit length of the BCA signal, a failure in stripe detection will not exhibit any influence, thus being able to output a BCA detection signal which is more stably accurate. This is the same reason as that described concerning the period B. Thus, so long as at least one of the two stripes adjoining a given stripe is detected, the BCA detection signal will never take the low level.

Note that, if the aforementioned period B and/or period D are set to be less than four times the channel bit length of the BCA 202, each period may elapse before reaching the next stripe of an undetected stripe, thus allowing the BCA detection signal to take the low level. Therefore, it may not be possible to output a stably accurate BCA detection signal.

In the present specification, no specific examples of the periods A to F and no specific examples of the levels L and S of the RF signal are given. The reason is that such values fluctuate with respect to each standard and depending on the rotation speed, etc., of each optical disk, and thus are difficult to be unequivocally described. It is also practiced to describe the periods A to F in terms of the length, etc., of the waveform or the like of each signal. Nonetheless, a period A for a DVD-ROM may be as follows: for a rotation speed of 1440 rpm, the stripes are 3.00±1.50 µs; the period A in this case is less than 1.50 µs.

Industrial Applicability

An optical disk playback apparatus according to the present invention is equipped with a method of stripe detection which utilizes the periodicity of stripes in an area of additional information. As a result, without providing a switch for position detection, it is possible to determine with a high precision whether a laser light-irradiated position is positioned within the area of additional information or not. This is useful for an apparatus which reads information that is added by processing into stripe-form a portion of a position at which main information is recorded.

The invention claimed is:

1. An optical disk apparatus for reading information which is recorded on an optical disk, wherein,
the optical disk includes: a data area for recording main information; and an identification area for recording identification information for identifying the optical disk, the identification area having optical characteristics different from those of the data area,
the optical disk apparatus comprising:
an optical pickup for radiating light onto the optical disk and detecting reflected light from the optical disk to generate a light amount signal;
a detecting section for outputting a detection signal whenever a change in the signal level of the light amount signal is detected;
a retriggerable pulse signal output section for generating a pulse signal which continues for a first predetermined time (B), the retriggerable pulse signal output section being triggered by the detection signal; and
an area determination section for determining whether an irradiated position of the light is within the identification area or not based on the pulse signal,
wherein the area determination section is adapted for comparing a duration of the pulse signal with a second predetermined time (C) longer than the first predetermined time (B) and determines whether the irradiated position of the light is within the identification area or not based on the result of the comparing.

2. The optical disk apparatus of claim 1, wherein the detecting section outputs the detection signal when the change in the signal level of the light amount signal has continued for a third predetermined time (A)or longer.

3. The optical disk apparatus of claim 2, wherein the detecting section calculates an average value of the signal level of the light amount signal, and outputs the detection signal when the level of the light amount signal remains lower than the average value continuously for the third predetermined time (A)or longer.

4. The optical disk apparatus of claim 2, wherein the detecting section outputs the detection signal when the level of the light amount signal remains lower than a predetermined fixed value continuously for the third predetermined time (A) or longer.

5. The optical disk apparatus of claim 4, wherein the detecting section retains as the fixed value a design value which is lower than a minimum level of the light amount signal obtained during a read of the main information and which is higher than a minimum level of the light amount signal obtained during a read of the identification information.

6. The optical disk apparatus of claim 1, wherein the area determination section compares the duration of the pulse signal and the second predetermined time (C) before one rotation cycle of the optical disk elapses.

7. The optical disk apparatus of claim 1, wherein,
the identification area of the optical disk is one of a burst cutting area and a narrow burst cutting area, in which a plurality of stripes are added, the identification information being described in terms of intervals at which the plurality of stripes are recorded, and wherein
the first predetermined time (B) is equal to or greater than a time which is necessary for reading two adjoining stripes that are recorded at a maximum interval.

8. The optical disk apparatus of claim 1, wherein the detecting section measures changing periods during which the signal level of the light amount signal changes, and outputs by every second predetermined time (C) a detection signal which specifies a longest period among the changing periods.

9. The optical disk apparatus of claim 8, wherein, each time the detection signal is output, the retriggerable pulse signal output section determines whether or not the longest period has continued for a fourth predetermined time (D) or longer, and if it has, outputs a pulse signal which continues for the second predetermined time (C).

* * * * *